US006617412B2

(12) United States Patent
Markusch et al.

(10) Patent No.: US 6,617,412 B2
(45) Date of Patent: Sep. 9, 2003

(54) FERTILIZER ENCAPSULATION USING SULFUR CONTAINING POLYOLS

(75) Inventors: Peter H. Markusch, McMurray, PA (US); Robert L. Cline, Paden City, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/976,610

(22) Filed: Oct. 12, 2001

(65) Prior Publication Data

US 2003/0089150 A1 May 15, 2003

(51) Int. Cl.[7] .................. C08G 18/40; C08G 75/00; A01N 25/00; A01N 27/00; A01N 31/00
(52) U.S. Cl. ................ 528/65; 528/66; 528/76; 528/85; 528/373; 71/1; 71/31; 71/64.07; 71/64.11; 71/64.13; 521/155
(58) Field of Search .................. 528/65, 66, 76, 528/85, 373; 71/1, 31, 64.07, 64.11, 64.13; 521/155

(56) References Cited

U.S. PATENT DOCUMENTS

| 3,259,482 A | 7/1966 | Hansen ........................... 71/64 |
| 3,264,088 A | 8/1966 | Hansen ........................... 71/64 |
| 3,264,089 A | 8/1966 | Hansen ........................... 71/64 |
| 3,342,577 A | 9/1967 | Blouin et al. ..................... 71/3 |
| 3,475,154 A | 10/1969 | Kato ............................. 71/64 |
| 3,876,568 A | 4/1975 | Wysocki .............. 260/2.5 AW |
| 3,892,686 A | 7/1975 | Woo .................... 260/2.5 A |
| 4,081,429 A | 3/1978 | Wyman et al. ....... 260/77.5 AB |
| 4,369,055 A | 1/1983 | Fujita et al. ............... 71/64.11 |
| 4,412,072 A | 10/1983 | Kamatani et al. ............. 544/68 |
| 4,479,820 A | 10/1984 | Merk et al. ..................... 71/67 |
| 4,711,659 A | 12/1987 | Moore ........................... 71/93 |
| 4,929,707 A | 5/1990 | Nagata et al. ................ 528/76 |
| 4,969,947 A | 11/1990 | Moore ........................... 71/28 |
| 5,194,559 A | 3/1993 | Okazaki et al. ............... 528/49 |
| 5,219,465 A | 6/1993 | Goertz et al. .................. 71/28 |
| 5,538,531 A | 7/1996 | Hudson et al. ................. 71/28 |
| 5,599,374 A | 2/1997 | Detrick ........................... 71/28 |
| 5,645,624 A | 7/1997 | Naka et al. ................ 71/64.07 |
| 6,152,981 A | 11/2000 | Markusch et al. ............... 71/1 |

FOREIGN PATENT DOCUMENTS

| EP | 0 867 422 | 9/1998 |
| JP | 52-38361 | 3/1977 |

OTHER PUBLICATIONS

Database WPI, Section Ch, Week 199645, Derwent Publications Ltd., London, GB; Class C04, AN 1996–450885, XP002221627 & JP 08 225387 A (Mitsubishi Chem Corp) Sep. 3, 1996 abstract.

*Primary Examiner*—Duc Truong
(74) *Attorney, Agent, or Firm*—Joseph C. Gil; N. Denise Brown

(57) ABSTRACT

This invention relates to fertilizer encapsulation with polyurethanes wherein the isocyanate-reactive composition contains sulfur. The process of the present invention comprises applying a polyisocyanate composition to fertilizer particles, applying an isocyanate-reactive composition which contains sulfur to the polyisocyanate coated fertilizer particles, or applying an isocyanate-reactive composition which contains sulfur to fertilizer particles and then applying a polyisocyanate composition to the isocyanate-reactive coated fertilizer particles, and repeating these steps as necessary to form sulfur containing polyurethane encapsulated fertilizer particles.

16 Claims, No Drawings

FERTILIZER ENCAPSULATION USING SULFUR CONTAINING POLYOLS

BACKGROUND OF THE INVENTION

This invention relates to a process of dispersing sulfur in an isocyanate-reactive composition, reacting the isocyanate-reactive composition with suitable co-reactants (i.e. polyisocyanates) to form polyurethanes and/or polyureas containing finely divided sulfur particles embedded in the polymer matrix. This invention also relates to a process for producing encapsulated fertilizers. This process may comprising applying at least one coat of an isocyanate component to fertilizer particles, applying at least one coat of an isocyanate-reactive compositions containing sulfur to the isocyanate coated fertilizer particles, and repeating as necessary to form sulfur containing polyurethane encapsulated fertilizer particles. The process may also comprise applying an isocyanate-reactive composition containing sulfur to fertilizer particles, applying an isocyanate component to the isocyanate-reactive composition coated fertilizer particles, and repeating as necessary to form sulfur containing polyurethane encapsulated fertilizer particles. Another embodiment of the present invention comprises pre-mixing an isocyanate component with an isocyanate-reactive composition containing sulfur, and applying this mixture to fertilizer particles to form sulfur containing polyurethane encapsulated fertilizer particles. The present invention also relates to the encapsulated fertilizers produced by these processes.

Elementary sulfur is used in many applications, i.e., as a vulcanizing agent in the rubber industry, as a component in the preparation of thiokols (organic polysulfides used, i.e., as sealants, adhesives, impregnation agents and insulation materials), as part of match making compositions, as a raw material for black powder production (mixture of sulfur, charcoal and potassium nitrate). Sulfur has also been used to encapsulate fertilizers to control the release of plant nutrients. In this case, the sulfur is applied to the fertilizer particles in either a molten form or dispersed in an organic liquid.

In many of these applications, it would be desirable to use sulfur in a diluted form either as a solution in a liquid organic compound or in form of very finely divided, homogeneously dispersed particles.

Elementary sulfur is insoluble in water and almost all liquid organic compounds such as, for example, alcohols, esters, ethers, ketones, etc, except for some organic compounds that have sulfur already chemically bonded to the organic molecules, i.e., $CS_2$ (carbon disulfide) and certain thiols, alkyl sulfides, sulfoxides, sulfones and sulfonic acids. (See Basic Principles of Organic Chemistry, John D. Roberts and Majorie C. Caserio, Published by W. A. Benjamin, Inc., 1965, New York, Amsterdam; Sulfur Solubility in Pure and Mixed Organic Solvents, Ind. Eng. Chem. Res., 1988, 27, pp. 485–491; and "Solubility of Elemental Sulfur in a Number of Organic Solvents" by G. S. Frolov, V. I. Lazarev, I. S. Antsypovich and T. V. Epishkina translated from Zhurnal Prikladnoi Khimii, Vol.48, No. 8, pp.1853–1855, August, 1975, Original Article submitted Oct. 14, 1974.

Commercial particulate fertilizers are produced and marketed in several different particle types, i.e., granular, pelletized, dusts, pilled, and prilled fertilizers. Also, they may be formed of inorganic substances, organic substances, or combinations thereof. The sulfur-containing isocyanate-reactive compositions of the present invention can be applied to any of these types of particulate fertilizers.

In order to be effective in promoting plant growth, fertilizers must contain some amount of water soluble plant nutrients. These are typically in the form of water soluble compounds of nitrogen, phosphorus and potassium, alone or in combination, and often in conjunction with other elements such as, for example, calcium, boron, magnesium, zinc, chlorine, etc. Such particular fertilizers can be made of a single component, e.g., urea, ammonium nitrate, potassium chloride, etc., or of multiple components often mixed with inert water soluble or water insoluble materials as in common fertilizers designated as 6-6-6, 4-6-4, 10-10-10, 20-20-5, 14-16-0, 5-20-20, and the like. In addition, specialized fertilizers may contain optional additives such as herbicides, insecticides, trace elements, iron salts, sulfur, etc. The sulfur-containing isocyanate-reactive compositions of the present invention can be applied to any of these fertilizers.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are well documented in previous patents that professed solutions to one or more of the known defects, including U.S. Pat. Nos. 3,475,154, 3,259,482, 3,264,088, 3,264,089, 4,711,659, 4,772,490 and Japanese Patent 52-38361.

A number of slow release coatings for particulate fertilizers have previously been proposed. One of the methods to achieve slower release of the fertilizer has been the application of liquid sulfur which is usually done in a rotating horizontal drum. The fertilizer is usually preheated to 160 to 180° F. and the molten sulfur (290° F.) is sprayed from nozzles onto the granules. However, when the sulfur comes in contact with the fertilizer granules, it solidifies rapidly and thus, is deposited in the form of chunks and flakes on the fertilizer surface. Although the release of nutrients is slowed down by using this treatment, the fertilizer is only partially encapsulated and the sulfur is inherently brittle and does not provide the necessary abrasion resistance and protection when these sulfur coated fertilizers are packaged, transported and, finally, applied by a spreader. Thus, a lot of the sulfur may have already delaminated from the fertilizer particle and the slow release properties are further diminished. The process of sulfur coating urea particles is described in U.S. Pat. No. 3,342,577 and was developed in the late 1960's by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then, imperfections remain in the coating, making it necessary to apply a sealant coating, which, for example, can be composed of a mixture of 30% polyethylene resin in a 70% bright stock mineral oil.

Coatings in which preformed polymer resins are applied from solvents have been described in, for example, U.S. Pat. Nos. 3,475,154 and 3,264,089. The use of solvents creates a vapor hazard and environmental problem as the products are dried and the solvent evaporation step can result in pinhole imperfections in the coatings when applied.

U.S. Pat. No. 4,369,055 tried to facilitate degradation of coating materials while maintaining the function for controlling the dissolving-out rate by dispersing inorganic powders such as sulfur and talc in a low molecular weight olefin polymer. However, the disclosed coating materials do not provide good attrition resistance and are not completely degraded and thus remain intact in the soil.

Polyurethane coatings as disclosed in U.S. Pat. Nos. 4,711,659 and 4,969,947 require that the substrate contains a minimum quantity of reactive —NH$_2$ groups. Thus, these are not applicable to all fertilizer compositions for which slow release properties may be desirable.

U.S. Pat. No. 5,538,531 also describes controlled release fertilizers and a method for their production. These controlled release fertilizers have a central mass of particulate fertilizer which contains at least one water soluble plant nutrient surrounded by a plurality of coatings. The inner coating comprises the reaction product of (A) an aromatic polyisocyanate or derivatives thereof which contain about 1.5 to 3 NCO groups per molecule and an NCO group content of 10 to 50% by weight, and (B) a polyol having from 2 to 6 hydroxyl moieties and at least one alkyl moiety containing from about 10 to 22 carbon atoms. An outer coating is also necessary. The outer coating consists essentially of an organic wax having a drop melting point of between 50 and 120° C. The encapsulated fertilizers of U.S. Pat. No. 5,538,531 do not, however, contain sulfur in any form.

U.S. Pat. No. 5,645,624 describes an encapsulated fertilizer using first a layer of rapidly biodegradable aliphatic polyester and polyurethane compound followed by a slowly biodegradable layer based on cellulose derivatives and hydrocarbon compound to control the release rate of the fertilizer.

U.S. Pat. No. 3,876,568 discloses polyisocyanurate-urethane foams used in insulation and structural reinforcement applications. A low smoke output is achieved by the addition of elementary sulfur to the composition.

U.S. Pat. No. 3,892,686 discloses sulfur-based cellular foams used in insulating and building applications. Aromatic carbocyclic or heterocyclic compounds substituted by —OH, or —NHR groups are reacted with molten sulfur to form aromatic polysulfides and are subsequently cross-linked and cooled to ambient temperature.

U.S. Pat. No. 4,081,429 discloses the heat stabilization of a polyurethane elastomer catalyzed with organo-metallic catalyst accomplished by adding a minor amount of elemental sulfur or sulfur-donor material to the liquid mixture of polyol and organic polyisocyanate at the time the catalyst is added. Elimination of the organo-metallic catalyst prevents depolymerization of the urethane, and the urethane therefore remains solid at high temperatures for much longer periods of time than has heretofore been possible.

U.S. Pat. No. 4,412,072 discloses a composition, which comprises a stabilized reaction product of an organic isocyanate with carbon dioxide and at least one stabilizing additive. The stabilizing additive is selected from the group consisting of an organic peroxide, an inorganic peroxide, sulfur, a polysulfide compound having an S—S bond, a metal sulfide and a halogen and is admixed with the reaction product whereby the reaction product contains an isocyanate having a stabilized oxadiazinetrione ring structure.

In U.S. Pat. No. 4,929,707 polyurethane base lens resins obtained by reacting one or more of sulfur-containing polyisocyanates compound with one or more of sulfur-containing polyols, and polyurethane base lenses comprising these resins are disclosed. A method for preparing polyurethane base lenses which comprises adding internal mold releasing agents to the mixture of the above polyisocyanates and polyols prior to casting polymerization is also disclosed.

U.S. Pat. No. 5,194,559 discloses a process for producing an optical urethane resin of improved hue, by reacting at an isocyanate compound selected from the group consisting of polyisocyanate compounds and isothiocyanato-containing isocyanate compound with an active hydrogen compound selected from the group consisting of polyol compounds, polythiol compounds and hydroxythiol compounds. The (NCO+NCS)/(OH+SH) functional group molar ratio is from 0.5 to 3.0.

U.S. Pat. No. 5,219,465 discloses a process for the preparation of an extended residual controlled, release sulfur coated fertilizer product. The process comprises coating a particulate water-soluble fertilizer core with a fresh primary sulfur coating to provide a surface on said fertilizer core; applying a polymeric topcoat over said fresh primary sulfur coating. The polymeric topcoat consists essentially of a water insoluble polymeric film-forming composition having membrane-like permeability characteristics.

U.S. Pat. No. 5,599,374 discloses a process for the preparation of sulfur-coated urea granular fertilizer products comprising the steps of
1) coating preheated urea granules with molten sulfur to obtain a coating;
2) coating the sulfur-coated urea granules of step 1 with reactive monomers and polymerizing said monomers on the surface of the sulfur-coated urea granules to form an impact resistant polymer sealant coating; and 3) cooling the polymer coated sulfur-coated urea granules product.

U.S. Pat. No. 6,152,981 discloses sulfur containing isocyanate compositions and a process for the production of encapsulated fertilizers from these isocyanate compositions that contain sulfur. By dissolving sulfur in the isocyanate at elevated temperatures and then using this to form an encapsulated fertilizer, it was found that the sulfur is finely divided in the isocyanate and is evenly dispersed on the surface of an encapsulated fertilizer particle. This is an improvement over applying sulfur directly onto an encapsulated fertilizer as a liquid, which resulted in large chunks of sulfur on the surface.

However, the overall concentration of sulfur that can be applied to the isocyanate compositions in U.S. Pat. No. 6,152,981 can not exceed 50%. This total amount of sulfur is due to the fact that only about 20% sulfur can be dissolved in the isocyanates even at temperatures as high as 140° C., and even when sulfur is dispersed in the isocyanate. If the isocyanate reactive composition has a similar equivalent weight as the isocyanate and the compositions are applied in stoichiometric ratios, the resulting polyurethane encapsulation will contain only about 25% of sulfur. If the equivalent weight of the isocyanate reactive composition is even higher than the isocyanate, the percentage of sulfur is further reduced. However, when high equivalent weight isocyanate reactive compositions containing sulfur are used (commonly used polyols for polyurethane elastomers) as co-reactants for the isocyanate inferior slow release properties were obtained.

Surprisingly, in the present invention, it was found that using isocyanate reactive compositions having an equivalent weight of less than 200, and containing up to 80% sulfur, preferably up to 60% sulfur, result in polyurethane encapsulated fertilizer with excellent slow release properties. Another advantage of incorporation of sulfur in the isocyanate reactive composition is that, differently from adding it to the isocyanate, it does not require heating but simple dispersing at ambient temperature. Another surprising advantage of the present invention is that substitution of polyurethane by sulfur in the encapsulation leads to even slower release. Advantageously, sulfur is not only cheap and biodegradable, but also improves the slow release properties of the encapsulated fertilizer pellets.

Further advantages of the present invention include the fact that the isocyanate-reactive compositions of the present invention provide an improvement in the production of particulate fertilizers by allowing additional sulfur to be distributed homogeneously onto the surface of the fertilizer particles. Upon reaction of the sulfur containing active-hydrogen containing compositions with a suitable (liquid) polyisocyanate, solid polyurethanes and/or polyureas are formed that contain high percentages of sulfur in an evenly distributed, finely divided form throughout the polymer matrix. Surprisingly, the resulting very high substitution of polyurethane by sulfur (>50%) leads to even slower release properties compared to using all polyurethane.

SUMMARY OF THE INVENTION

This invention relates to a process for the production of polyurethane encapsulated fertilizer particles. This process comprises 1) applying an isocyanate-reactive composition which contains sulfur to fertilizer particles to form coated fertilizer particles; and 2) applying a polyisocyanate composition onto these coated fertilizer particles from step 1) to form polyurethane encapsulated fertilizer particles. These two steps are optionally repeated (successively) as many times as necessary, with the polyurethane encapsulated fertilizer particles from step 2) being substituted for the fertilizer particles in step 1), until the desired thickness of the polyurethane coating which encapsulates the fertilizer particles is obtained. The resultant polyurethane encapsulated fertilizer particles contain from about 2 to about 20%, preferably from about 3 to about 15%, and most preferably from about 4 to about 10% by weight of sulfur containing polyurethane, based on the total weight of the encapsulated fertilizer composition.

Other aspects of the present invention include a process for producing encapsulated fertilizers comprising first applying the polyisocyanate composition to fertilizer particles, followed by applying the isocyanate-reactive composition which contains sulfur to these coated fertilizer particles. The application step(s) is/are optionally repeated (successively where two steps are involved) as many times as necessary, with the coated fertilizer particles being substituted for the fertilizer particles in step 1), until the desired thickness of the polyurethane coating which encapsulates the fertilizer particles is obtained. The resultant polyurethane encapsulated fertilizer particles contain from about 2 to about 20%, preferably from about 3 to about 15%, and most preferably from about 4 to about 10% by weight of sulfur containing polyurethane, based on the total weight of the encapsulated fertilizer composition.

In the present invention, it is possible that the fertilizer particles are encapsulated with layers of different polyurethanes and/or polyureas. Some of the individual layers may not contain sulfur at all. Different layers of encapsulating polyurethanes and/or polyureas can be applied to fertilizer particles by following one of the processes as described above in which the isocyanate or the isocyanate-reactive composition is applied first, and the isocyanate-reactive or the isocyanate composition, respectively, is applied to the pre-coated fertilizer particles, to form a polyurethane and/or polyurea encapsulating layer. The composition of the polyurethane and/or polyurea encapsulating layer is altered by the selection of the isocyanate component and the isocyanate-reactive composition used to form each layer. By proper selection of the respective compositions for each layer, it is possible, for example, to produce encapsulated fertilizer particles having a first layer of polyurethane, followed by a second layer of polyurethane/-polyurea, followed by a third layer of polyurea, a fourth layer of polyurethane, etc. Thus, some of these layers may not contain finely dispersed sulfur. Of course, at least one layer of encapsulating material must be derived from an isocyanate-reactive composition which contains sulfur as described herein. Overall, the sum of the encapsulating layers should contain at least 5% by weight, preferably at least 20% by weight and most preferably at least 40% by weight of sulfur, based on 100% by weight of the encapsulating layers.

DETAILED DESCRIPTION OF THE INVENTION

Suitable polyisocyanates which may be used in forming the isocyanate compositions in accordance with the present invention include monomeric diisocyanates, NCO prepolymers, and preferably liquid polyisocyanates and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,1 2-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl)methane, 2,4'-dicyclohexylmethane diisocyanate, 1,3- and 1,4-bis (isocyanatomethyl)cyclohexane, bis(4-isocyanato-3-methyl-cyclohexyl)methane, $\alpha,\alpha,\alpha',\alpha'$-tetramethyl-1,3- and/or -1,4-xylylene diisocyanate, 1-isocyanato-1-methyl-4 (3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly (phenylisocyanates) obtained by phosgenating aniline/formaldehyde condensates may also be used.

In accordance with the present invention, at least a portion of the polyisocyanate composition may be present in the form of an NCO prepolymer or a polyisocyanate adduct, preferably a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 28% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

Preferred polyisocyanate adducts are the polyisocyanates containing urethane groups, isocyanurate groups, biuret groups, allophanate groups or mixtures of isocyanurate and allophanate groups.

The NCO prepolymers, which may also be used as the polyisocyanate composition in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 5,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic poly-isocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) obtained by phosgenating aniline/formaldehyde condensates may also be used.

It is more preferred that the polyisocyanates for the presently claimed invention are polymethylene poly(phenylisocyanate) compositions having a functionality of from about 2.1 to about 3.5, preferably 2.2 to 3.2 and most preferably of 2.3 to 2.8, and an NCO group content of about 26% to about 33.4%, preferably about 30.5% to about 33%, and a monomeric diisocyanate content of from about 20% to about 90% by weight, preferably from about 40% to about 80%, wherein the content of monomeric diisocyanate comprises up to about 5% by weight of the 2,2'-isomer from about 1 to about 25% by weight of the 2,4'-isomer, and from about 25 to about 70% by weight of the 4,4'-isomer, based on the entire weight of the isocyanate composition. The polymeric MDI content of these isocyanates varies from about 10 to about 80% by weight, preferably from about 20% to about 60% by weight.

Polymeric MDI as used herein, refers to polymethylene poly(phenyl-isocyanate) which in addition to monomeric diisocyanate (i.e., two-ring compounds) contains three-ring and higher ring containing products.

Most preferred polyisocyanates include, for example, polymethylene poly phenylisocyanate) compositions having an average functionality of from about 2.2 to about 3.2, preferably about 2.3 to about 2.8, an NCO group content of about 30 to 33% by weight, and a monomer content of from about 40 to 80% by weight, wherein the content of monomer comprises no more than about 2% by weight of the 2,2'-isomer, from about 2 to about 25% by weight of the 2,4'-isomer and from about 35 to about 60% by weight of the 4,4'-isomer, based on the entire weight of the composition. This isocyanate composition comprises from about 20 to about 60% by weight of polymeric MDI.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Isocyanate prepolymers including, for example, those based on diphenylmethane diisocyanate which may be based on either polyethers or polyesters are also suitable for the present invention.

A preferred polyisocyanate comprises a polymethylene poly-(phenylisocyanate) having an NCO content of about 32.4%, a functionality of about 2.5, a viscosity of about 57 mPa·s at 25° C., and having a monomer content of about 61% by weight. Of the 61% monomer, about 18.0% by weight is the 2,4'-isomer of MDI, about 2% by weight is the 2,2'-isomer of MDI and about 41% is the 4,4'-isomer of MDI.

Another preferred polyisocyanate component comprises a polymethylene poly(phenylisocyanate) having an NCO content of about 32.3%, a functionality of about 2.8, a viscosity of about 160 mPa·s at 25° C., and having a monomer content of about 45% by weight. Of the 45% by weight monomer, about 44% is the 4,4'-isomer of MDI and about 1% by weight is the 2,4'-isomer of MDI.

Diphenylmethane diisocyanate which is rich in the 2,4'-isomer is another preferred isocyanate for the present invention. Specifically, diphenylmethane diisocyanate having an isomer distribution comprising about 44% by weight of the 4,4'-isomer, about 54% by weight of the 2,4'-isomer and about 2% by weight of the 2,2'-isomer. This diisocyanate has an NCO content of about 33.6%, a functionality of about 2.0 and a viscosity of less than about 25 mPa·s at 25° C.

Suitable isocyanate-reactive compositions to be used in accordance with the presently claimed invention include, for example, those isocyanate-reactive compounds containing from 2 to 8 hydroxyl groups capable of reacting with the NCO groups of the polyisocyanate component, and having a molecular weight of from about 106 to about 1600, and an equivalent weight of about 31 to less than about 200. Suitable compounds to be used as the isocyanate-reactive composition in the present invention include, for example, diols, triols, tetrols and other higher functionality polyols, as well as polyether polyols, including for example, alkoxylation products of di-, tri- and higher functionality starter molecules such as, for example, ethylene glycol, propylene glycol, glycerol, trimethylolpropane, diethylene glycol, dipropylene glycol, tripropylene glycol, pentaerythritol, sucrose, sorbitol, and polyether polyols having an equivalent weight of less than 200 and a functionality of 2 to 8. Suitable polyether polyols can be prepared by reaction of the above listed hydroxyfunctional compounds with alkylene oxides such as propylene oxide and/or ethylene oxide.

In the embodiment according to the invention wherein the polyisocyanate composition is applied first to the fertilizer particles and the isocyanate-reactive composition which contains sulfur is applied second (i.e. to the isocyanate coated fertilizer particles), it is preferred that the isocyanate-reactive compositions contain from 2 to 4 hydroxyl groups, and have a molecular weight of from 106 to 400 and an equivalent weight of from about 31 to less than about 100. In this embodiment, it is more preferred that the isocyanate-reactive compositions contain from 2 to 3 hydroxyl groups, and have a molecular weight of 100 to 300 and an equivalent weight of from 50 to 100. Diethylene glycol and tripropylene glycol are particularly preferred isocyanate-reactive compositions for this embodiment.

In the embodiment according to the invention wherein the isocyanate-reactive composition which contains sulfur is applied to the fertilizer particles first, and the isocyanate composition is applied second, it is preferred that the isocyanate-reactive compositions contain from 2 to 8 hydroxyl groups, and have a molecular weight of from 200 to 1600 and an equivalent weight of from about 90 to less than about 200. In this embodiment, it is more preferred that the isocyanate-reactive compositions contain from 3 to 6.5 hydroxyl groups, and have a molecular weight of 270 to 1200 and an equivalent weight of from 100 to 185. Trimethylolpropane and sucrose/water initiated propylene oxide polyether polyols are particularly preferred isocyanate-reactive compositions for this embodiment.

The preparation of sulfur containing isocyanate-reactive compositions is relatively simple. Powdered sulfur may be dispersed in the chosen isocyanate-reactive composition at room temperature by stirring or shaking or any other type of mixing. The isocyanate-reactive composition does not dissolve the sulfur and the finely dispersed sulfur may precipitate upon storage. However, it can easily be redispersed by any type of mixing outlined above.

In certain applications, it may be desirable to disperse the sulfur in the isocyanate-reactive composition at elevated temperatures, which lowers the viscosity of the isocyanate reactive composition facilitating the mixing with the sulfur. Then the isocyanate-reactive composition can be stored and used at ambient temperature. If stored under dry conditions, these suspensions of sulfur in isocyanate-reactive compositions are stable for a long time, i.e., greater than 6 months, up to about 1 year. If the sulfur settles out on the bottom of a container, it can easily be redispersed by known techniques.

Whenever the isocyanate-reactive composition containing sulfur in the suspended form is reacted with an isocyanate composition such as, for example, a polyisocyanate, a diisocyanate, an isocyanate prepolymer, etc., the sulfur becomes finely divided in the polyurethane matrix.

In the encapsulation of fertilizer, the sulfur containing polyurethane does not only provide abrasion resistance and slow release properties, but the sulfur also represents a micro-nutrient source for the plants for which the fertilizer is used. Sulfur is biodegradable and can be converted in a weaker soluble form by oxidative and reductive processes. Thus, the sulfur containing isocyanate-reactive compounds can be used in biodegradable formulations. Biodegradation, however, also depends on which isocyanates and polyols are chosen to form the polymer.

The sulfur containing isocyanate-reactive compositions suitable for the present invention are prepared by dispersing the desired amount of sulfur, in the isocyanate-reactive composition of choice.

The sulfur containing isocyanate-reactive compositions can be subsequently reacted with polyisocyanate compositions such as, for example, diisocyanates, isocyanate-prepolymers, allophanate-modified diisocyanates and prepolymers thereof, etc.

Catalysts known in polyurethane chemistry may be added to accelerate the reaction between isocyanates and the isocyanate-reactive compositions. Inorganic fillers may also be used in the present invention. Some examples of suitable inorganic fillers include talc, calcium carbonate, etc.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Examples

The following Components were Used in the Examples

Isocyanate A:

a polymethylene poly (phenylisocyanate) having an NCO content of about 32.4%, a functionality of about 2.5, a viscosity of about 57 mPa · s at 25° C., and having a monomer content of about 61% by weight. Of the 61% monomer, about 18.0% by weight is the 2,4'-isomer of MDI, about 1.8% by weight is the 2,2'-isomer of MDI and the balance is the 4,4'-isomer of MDI.

-continued

Sulfur:

Precipitated sulfur powder, commercially available from Fisher Scientific.

Polyol A:

diethylene glycol (DEG) having a functionality of 2, a molecular weight of 106 and an equivalent weight of 53.

Polyol B:

tripropylene glycol (TPG) having a functionality of 2, a molecular weight of 192 and an equivalent weight of 96.

Polyol C:

a propylene glycol initiated propylene oxide (100% by wt.) polyether polyol having a functionality of about 2, an OH number of about 112, an equivalent weight of about 500, a molecular weight of about 1000, and a viscosity of about 145 mPa · s at 25° C..

Polyol D:

a triethanolamine initiated propylene oxide (100% by wt.) polyether polyol having a functionality of about 3, an OH number of 150, an equivalent weight of about 374, a molecular weight of about 1,122, and a viscosity of about 250 mPa · s at 25° C..

Polyol E:

a sucrose/propylene glycol/water initiated propyleneoxide (100% by weight) polyether polyol having a functionality of about 6.2, an OH number of 340, an equivalent weight of about 165, a molecular weight of about 1023, and a viscosity of about 9,000 mPa · s at 25° C..

Polyol F:

a trimethylolpropane initiated propylene oxide (100% by weight) polyether polyol having a functionality of about 3, an OH number of about 370, an equivalent weight of about 152, a molecular weight of about 456, and a viscosity of about 610 mPa · s at 25° C..

Polyol G:

a polyoxypropylene polyol having a functionality of about 3, an OH number of about 650, an equivalent weight of about 86, a molecular weight 258, and a viscosity of about 820 mPa · s at 25° C..

Polyol H:

a polyoxypropylene polyol having a functionality of about 3, an OH number of about 256, an equivalent weight of about 236, a molecular weight 708, and a viscosity of about 820 mPa · s at 25° C..

Polyol I:

a propylene glycol initiated propylene oxide (100% by wt.) polyether polyol having a functionality of about 2, an OH number of about 263, a equivalent weight of about 212, a molecular weight of about 425, and a viscosity of about 70 mPa · s at 25° C..

Polyol J:

n-butanol

Catalyst A:

dibutyltin dilaurate commercially available as Dabco T-12, commercially available from Air Products and Chemicals Inc.

Procedure:

Encapsulation of Fertilizer Pellets:

Procedure A: In each of the examples (using procedure A), the stated amount of the isocyanate or isocyanate/sulfur composition (see Tables) was added at ambient temperature (unless otherwise specified in the table) to 100 grams of urea fertilizer pellets (ambient temperature) in an 8 ounce bottle. The bottle was shaken until the isocyanate or isocyanate/sulfur composition was coated on the fertilizer pellets (about 2 to 3 minutes). The stated amount of polyol or polyol/sulfur composition (see tables) was then the added at ambient temperature to the isocyanate or isocyanate/sulfur coated pellets, and the bottle was shaken till the polyol or polyol/sulfur composition coated the isocyanate or isocyanate/sulfur coated pellets (about 2–3 minutes). The NCO/OH equivalent ratio was about 1.10/1.00 in each of the examples. This mixture was poured into an aluminum pan and placed into a 110° C. oven (the pellets were mixed 2 to 3 times while in the oven to prevent the pellets from sticking together) until they were dry and no longer stuck together (about 10 to 15 minutes). This procedure of coating and heating was repeated two more times using the same amounts of compositions. The last two coatings were applied on top of the first coating while the pellets coming out of the oven were still hot. Theoretically, this would result in about 5.74 to 6.03 polyurethane or polyurethane/sulfur encapsulation, based on the total weight of the encapsulated particles. However, the actual amount was about 5.0 to 5.3 due to about a 13–14% loss of the coating on the walls of the bottle.

Procedure B: Same as procedure A, except the polyol or polyol/sulfur composition was added to the urea fertilizer pellets first, followed by the isocyanate or the isocyanate/sulfur composition.

Test Procedure for Slow Release Properties:

After one week, the encapsulated fertilizer granules from each of the examples were compared to each other using the following test procedure: 20 grams of the encapsulated fertilizer pellets were combined with 80 grams of water, and stored at room temperature in a closed glass jar for 8 hrs. After this time, the solids were filtered off and the amount of solids dissolved in the aqueous phase was determined by evaporation of the water. The results are set forth in the Tables.

TABLE 1

| | Example 1 | Example 2 | Example 3 | Example 4 |
|---|---|---|---|---|
| Isocyanate | A | A | A, 50% Sulfur | A 60% Sulfur |
| Polyol | A | A 60% Sulfur | A 50% Sulfur | A 60% Sulfur |
| Wt. Ratio (grams) Iso/Polyol | 1.56/0.57 | 1.12/1.02 | 1.56/0.57 | 1.56/0.57 |
| % Sulfur in Polyurethane | 0 | 28.6 | 50 | 60 |
| % Polyurethane, based on the encapsulated fertilizer | 5.29 | — | — | — |
| % Polyurethane + Sulfur, based on the encapsulated fertilizer | — | 5.32 | 5.29 | 5.29 |
| Applied first (procedure) | Iso (A) | Iso (A) | Iso (A) | Iso (A) |
| Polyol EW | 53 | 53 | 53 | 53 |
| Polyol MW | 106 | 106 | 106 | 106 |
| Polyol Functionality | 2 | 2 | 2 | 2 |
| % Fertilizer Dissolved | 40.0 | 25.7 | 26 | 25 |

TABLE 2

|  | Example 5 (comparison) | Example 6 | Example 7 | Example 8 | Example 9 |
|---|---|---|---|---|---|
| Isocyanate | A | A | A 50% Sulfur | A | A |
| Polyol | B | B 50% Sulfur | B 50% Sulfur | B 10% Sulfur | B 20% Sulfur |
| Wt. Ratio (grams) Iso/Polyol | 1.285/0.845 | 0.92/1.21 | 1.285/0.845 | 1.232/0.90 | 1.17/0.962 |
| % Sulfur in Polyurethane | 0 | 28.4 | 50 | 4.22 | 9.02 |
| % Polyurethane, based on the encapsulated fertilizer | 5.29 | — | — | — | — |
| % Polyurethane + Sulfur, based on the encapsulated fertilizer | — | 5.29 | 5.29 | 5.29 | 5.29 |
| Applied first (procedure) | Iso (A) | Iso (A) | Iso (A) | Iso (A) | Iso (A) |
| Polyol EW | 96 | 96 | 96 | 96 | 96 |
| Polyol MW | 192 | 192 | 192 | 192 | 192 |
| Polyol Functionality | 2 | 2 | 2 | 2 | 2 |
| % Fertilizer Dissolved | 62 | 42 | 40 | 93.7 | 93.4 |

TABLE 3

|  | Example 10 comparison | Example 11 | Example 12 comparison | Example 13 comparison | Example 14 |
|---|---|---|---|---|---|
| Isocyanate | A | A | A | A | A |
| Polyol | F | F 50% Sulfur | F 50% Sulfur | G | G 50% Sulfur |
| Wt. Ratio (grams) Iso/Polyol | 1.05/1.09 | 0.66/1.37 | 0.66/1.37 | 1.34/0.79 | 0.98/1.15 |
| % Sulfur in Polyurethane | 0 | 33.7 | 33.7 | 0 | 27 |
| % Polyurethane, based on the encapsulated fertilizer | 5.32 | — | — | 5.29 | — |
| % Polyurethane + Sulfur, based on the encapsulated fertilizer | — | 5.02 | 5.02 | — | 5.29 |
| Applied first (procedure) | Polyol (B) | Polyol (B) | Iso (A) | Iso (A) | Iso (A) |
| Polyol EW | 152 | 152 | 152 | 86 | 86 |
| Polyol MW | 456 | 456 | 456 | 258 | 258 |
| Polyol Functionality | 3 | 3 | 3 | 3 | 3 |
| % Fertilizer Dissolved | 55.4 | 31.1 | 71.7 | 32.6 | 26.6 |

TABLE 4

|  | Example 15 (comparison) | Example 16 |
|---|---|---|
| Isocyanate | A | A |
| Polyol | E | E 50% Sulfur |
| Wt. Ratio (grams) Iso/Polyol | 1.00 1.13 | 0.65 1.48 |
| % Sulfur in Polyurethane | 0 | 34.7 |
| % Polyurethane, based on the encapsulated fertilizer | 5.29 | — |
| % Polyurethane + Sulfur, based on the encapsulated fertilizer | — | 5.29 |
| Applied first (procedure) | Polyol (B) | Polyol (B) |
| Polyol EW | 165 | 165 |
| Polyol MW | 1023 | 1023 |
| Polyol Functionality | 6.2 | 6.2 |
| % Fertilizer Dissolved | 43.5 | 32.4 |

TABLE 5

|  | Example 17 comparison | Example 18 comparison | Example 19 comparison | Example 20 comparison |
|---|---|---|---|---|
| Isocyanate | A | A | A | A |
| Polyol | C* | C* 50% Sulfur | D | D 50% Sulfur |
| Wt. Ratio (grams) Iso/Polyol | 0.48/1.65 | 0.27/1.86 | 0.6/1.53 | 0.35/1.78 |
| % Sulfur in Polyurethane | 0 | 43.7 | 0 | 41.8 |
| % Polyurethane, based on the encapsulated fertilizer | 5.29 | — | 5.29 | — |
| % Polyurethane + Sulfur, based on the encapsulated fertilizer | — | 5.29 | — | 5.29 |
| Applied first (procedure) | Polyol (B) | Polyol (B) | Polyol (B) | Polyol (B) |
| Polyol EW | 500 | 500 | 374 | 374 |
| Polyol MW | 1000 | 100 | 1122 | 1122 |
| Polyol Functionality | 2 | 2 | 3 | 3 |
| % Fertilizer Dissolved | 94 | 99 | 84 | 84 |

*Polyol C used in Examples 17 and 18 was very slow to react, so 0.06% by weight of Catalyst A (based on the total wt. of the polyol) was added to Polyol C)

TABLE 6

Comparison Examples

|  | Example 21 comparison | Example 22 comparison | Example 23 Uncoated Urea Pellets - comparison |
|---|---|---|---|
| Isocyanate | A | A | 0 |
| Polyol | I | I 50% Sulfur | 0 |
| Wt. Ratio (grams) Iso/Polyol | 0.87/1.26 | 0.55/1.59 | 0 |
| % Sulfur in Polyurethane | 0 | 37.2 | 0 |
| % Polyurethane, based on the encapsulated fertilizer | 5.29 | — | 0 |
| % Polyurethane + Sulfur, based on the encapsulated fertilizer | — | 5.32 | 0 |
| Applied first (procedure) | Polyol B | Polyol B | — |
| Polyol EW | 212.5 | — | — |
| Polyol MW | 425 | — | — |
| Polyol Functionality | 2 | 2 | — |
| % Fertilizer Dissolved | 98.7 | 97.3 | 90.2 |

Example 1 is a comparison example, which contains no sulfur in the polyol or the isocyanate. This example illustrates the release of (sulfur-free) polyurethane encapsulated fertilizers in which the isocyanate composition is applied first. Examples 2–4 represent the process of the present invention. The presence of sulfur in the polyurethane coating results in slower release properties of the encapsulated pellets. In Example 4, the pellets were 100° C. at the beginning of the coating and the polyol and isocyanate compositions were 40° C.

Example 5 is a comparison example which contains no sulfur in the polyurethane encapsulated pellets. Examples 6 and 7 represent the process of the present invention. The presence of sulfur in the polyurethane coating results in slower release properties in the encapsulated pellets. Example 6 shows that incorporation of 50% sulfur in the polyol, which results in 28% sulfur in the polyurethane encapsulation, results in substantially slower release properties compared a polyurethane encapsulation which contains no sulfur. Replacing 50% of the polyurethane encapsulation with sulfur as in Example 7 results in even slower release properties. To substitute such a high amount of polyurethane by sulfur, the sulfur has to be added to both the polyol and to the polyisocyanate to achieve acceptable viscosities of both co-reactants. Examples 8 and 9 are comparison examples and illustrate that low amounts of sulfur have a negative effect on slow release of encapsulated fertilizers.

Examples 10–12 illustrate that whenever the sulfur containing polyol has an equivalent weight of more than about 100 and a functionality of 3 or more, slow release is only obtained when the sulfur containing polyol is applied first. If the equivalent weight of the sulfur containing polyols is less than about 100 and the functionality is 3 or less, favorable slow release is obtained whenever the isocyanate is applied first. Examples 13 and 14 illustrate this.

Examples 15 and 16 also demonstrate that favorable slow release properties are only obtained when the higher functionality, higher molecular weight sulfur containing polyol is applied first. The polyol used in Examples 15 and 16 was viscous with a functionality over 6, and therefore, the polyol composition and the pellets were heated during processing.

Examples 17–22 are all comparison examples. Examples 17, 19 and 21 have polyurethane coated pellets, but contain no sulfur. Examples 18, 20 and 22 contain polyol compositions with equivalent weights of more than 200. These examples demonstrate that a sulfur containing polyol having an equivalent weight of more than 200 does not improve the slow release properties.

Example 23 is a control example, and is based on uncoated urea pellets.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an encapsulated, slow release fertilizer composition comprising:
   1) applying a polyisocyanate composition to fertilizer particles which contain at least one water soluble plant nutrient to form isocyanate coated fertilizer particles
   2) applying an isocyanate-reactive composition containing from 2 to 4 hydroxyl groups capable of reacting with the NCO groups of the isocyanate component, and having a molecular weight of about 106 to about 400, an equivalent weight of about 31 to less than about 100, and containing 30 to 80% by weight of sulfur based on 100% by weight of said isocyanate reactive composition, to the isocyanate coated fertilizer particles from step 1) to yield polyurethane encapsulated fertilizer particles; and
   3) repeating steps 1) through 2) as many times as necessary, wherein the encapsulated fertilizer particles from step 2) are substituted for the fertilizer particles in step 1) above;

thereby forming encapsulated fertilizer particles which contain from about 2 to 20% by weight of sulfur containing polyurethane, based on the total weight of the encapsulated fertilizer particles, wherein the polyurethane encapsulation contains at least 5% by weight of sulfur.

2. The process according to claim 1 wherein said polyisocyanate composition applied to the fertilizer particles comprises an aromatic di- or polyisocyanate.

3. The process according to claim 1, wherein said isocyanate-reactive composition contains at least about 40% by weight of sulfur, based on 100% by weight of the isocyanate-reactive composition.

4. The process according to claim 1 wherein said isocyanate-reactive composition contains from about 40 to about 60% by weight of sulfur, based on 100% by weight of the isocyanate-reactive composition.

5. The process according to claim 1 wherein said isocyanate-reactive composition contains at least about 50% by weight of sulfur, based on 100% by weight of the isocyanate-reactive composition.

6. The process according to claim 1 wherein said isocyanate-reactive composition comprises diethyleneglycol.

7. The process according to claim 1 wherein said isocyanate-reactive composition comprises tripropyleneglycol.

8. The process according to claim 1 wherein said isocyanate-reactive composition comprises a propylene oxide polyether polyol.

9. The process according to claim 1, wherein said polyisocyanate comprises polymethylene poly(phenylisocyanate).

10. A process for the production of an encapsulated, slow release fertilizer composition comprising:

1) applying an isocyanate-reactive composition to fertilizer particles which contain at least one water soluble plant nutrient to form fertilizer particles coated with the isocyanate-reactive composition, wherein said isocyanate-reactive composition has a functionality of 2 to 8, a molecular weight of about 200 to about 1600, an equivalent weight of at least about 100 to less than about 200, and containing 30 to 80% by weight of sulfur based on 100% by weight of said isocyanate reactive composition;

2) applying a polyisocyanate composition to the coated fertilizer particles from step 1) to yield polyurethane encapsulated fertilizer particles; and 3) repeating steps 1) through 2) as many times as necessary, wherein the encapsulated fertilizer particles from step 2) are substituted for the fertilizer particles in step 1) above;

thereby forming encapsulated fertilizer particles which contain from about 2 to 20% by weight of sulfur containing polyurethane, based on the total weight of the encapsulated fertilizer particles, wherein the polyurethane encapsulation contains at least 5% by weight of sulfur.

11. The process according to claim 10 wherein said polyisocyanate composition applied to the fertilizer particles comprises an aromatic di- or polyisocyanate.

12. The process according to claim 10 wherein said isocyanate-reactive composition contains at least about 40% by weight of sulfur, based on 100% by weight of the isocyanate-reactive composition.

13. The process according to claim 10 wherein said isocyanate-reactive composition contains from about 40 to about 60% by weight of sulfur, based on 100% by weight of the isocyanate-reactive composition.

14. The process according to claim 10 wherein said encapsulated fertilizer particles contain at least 50% by weight of sulfur, based on 100% by weight of the encapsulated fertilizer particles.

15. The process according to claim 10 wherein said isocyanate-reactive composition comprises a propylene oxide polyether polyol.

16. The process according to claim 10, wherein said polyisocyanate comprise polymethylene poly(phenylisocyanate).

* * * * *